United States Patent [19]

Aimar

[11] 4,161,669

[45] Jul. 17, 1979

[54] INSULATING ASSEMBLY FOR STATOR SLOTS OF ELECTRICAL MOTORS

[75] Inventor: Michele Aimar, Turin, Italy

[73] Assignee: ITW Fastex Italia, Turin, Italy

[21] Appl. No.: 805,253

[22] Filed: Jun. 10, 1977

[30] Foreign Application Priority Data

Jun. 16, 1976 [IT] Italy .................. 24359 A/76
Aug. 24, 1976 [IT] Italy .................. 26483 A/76

[51] Int. Cl.² ............................................. H02K 3/00
[52] U.S. Cl. .................................. 310/194; 310/215; 310/260
[58] Field of Search ............ 310/215, 43, 89, 42, 310/258, 259, 260, 40 MM, 162, 254, 163, 257, 164, 45, 91, 194, 216–218; 336/185, 208

[56] References Cited

U.S. PATENT DOCUMENTS

| 2,999,176 | 9/1961 | Lindtstrom | 310/194 |
|---|---|---|---|
| 3,027,475 | 3/1962 | Gaudry | 310/43 |
| 3,075,250 | 1/1963 | Strohm | 310/43 |
| 3,129,348 | 4/1964 | Simmons | 310/194 |
| 3,748,512 | 7/1973 | Crabb | 310/215 |
| 3,766,416 | 10/1973 | Papst | 310/43 |
| 3,768,152 | 10/1973 | Swanke | 310/43 |
| 3,861,026 | 1/1975 | Swaim | 310/215 |
| 3,956,651 | 5/1976 | Brammerio | 310/42 |
| 3,984,714 | 10/1976 | Grozinger | 310/194 |

Primary Examiner—R. Skudy
Attorney, Agent, or Firm—Jack R. Halvorsen; Robert W. Beart

[57] ABSTRACT

An insulating assembly for stator slots of electrical motors is provided comprising a pair of end plates of insulating material having a center opening for receiving a rotor and outwardly of said opening cutouts having the same shape as the stator slots of electrical motor, each of said cutouts having along the periphery thereof a flange extending from said end plate, intended to be inserted in a stator slot so as to form an insulating partition between the inner wall of the slots and the stator winding.

6 Claims, 10 Drawing Figures

INSULATING ASSEMBLY FOR STATOR SLOTS OF ELECTRICAL MOTORS

This invention relates to an insulating assembly for stator slots of electrical motors.

It is well known that electrical motor stators are formed of a stack of laminations in which slots for receiving windings have been formed. These windings must be insulated from the lamination stack. Heretofore, in order to obtain such insulation, insulating cardboards or the like are disposed into the slots and between the slots U-members or the like are applied for supporting the end turns of windings and thereafter windings are formed. During the latter operation some disadvantages occur due in part to the breakage of the U-members and in part to the breakage of the insulating cardboards, so that the stator windings of electrical motor are damaged resulting in a considerable waste.

This invention aims to obviate this disadvantage by providing a stator slot insulating assembly, simple in design, but rugged in construction, which permits the stator slots of electrical motor to be efficiently insulated and at the same time also the end turns of stator windings to be supported.

More particularly the insulating assembly for stator slots of electrical motor according to this invention is characterized in that it comprises a pair of end plates of insulating material having a center opening for receiving a rotor and outwardly of said center opening cutouts having the same shape as the stator slots of electrical motor, each of said cutouts having along the periphery thereof a flange extending from said end plate, intended to be inserted in a stator slot so as to form an insulating partition between the inner wall of the slots and the stator winding.

According to a feature of this invention the flanges of at least one half of the cutouts of one end plate are provided at the free ends thereof with a stepped-down edge intended to accurately enter the flanges without stepped-down edge of the other half of the cutouts of the other end plate.

According to another feature of this invention each end plate is provided on the side opposite that from which the flanges extend with posts integrally formed with the end plate and intended to hold the end turns of the windings.

By means of the insulating assembly according to the invention not only the stator slots, but also the front portions of stator are insulated.

This invention will be better described in connection with preferred embodiments thereof, shown in the accompanying drawings given merely by way of example and therefore not intended in a limiting sense, wherein.

Figure 1:
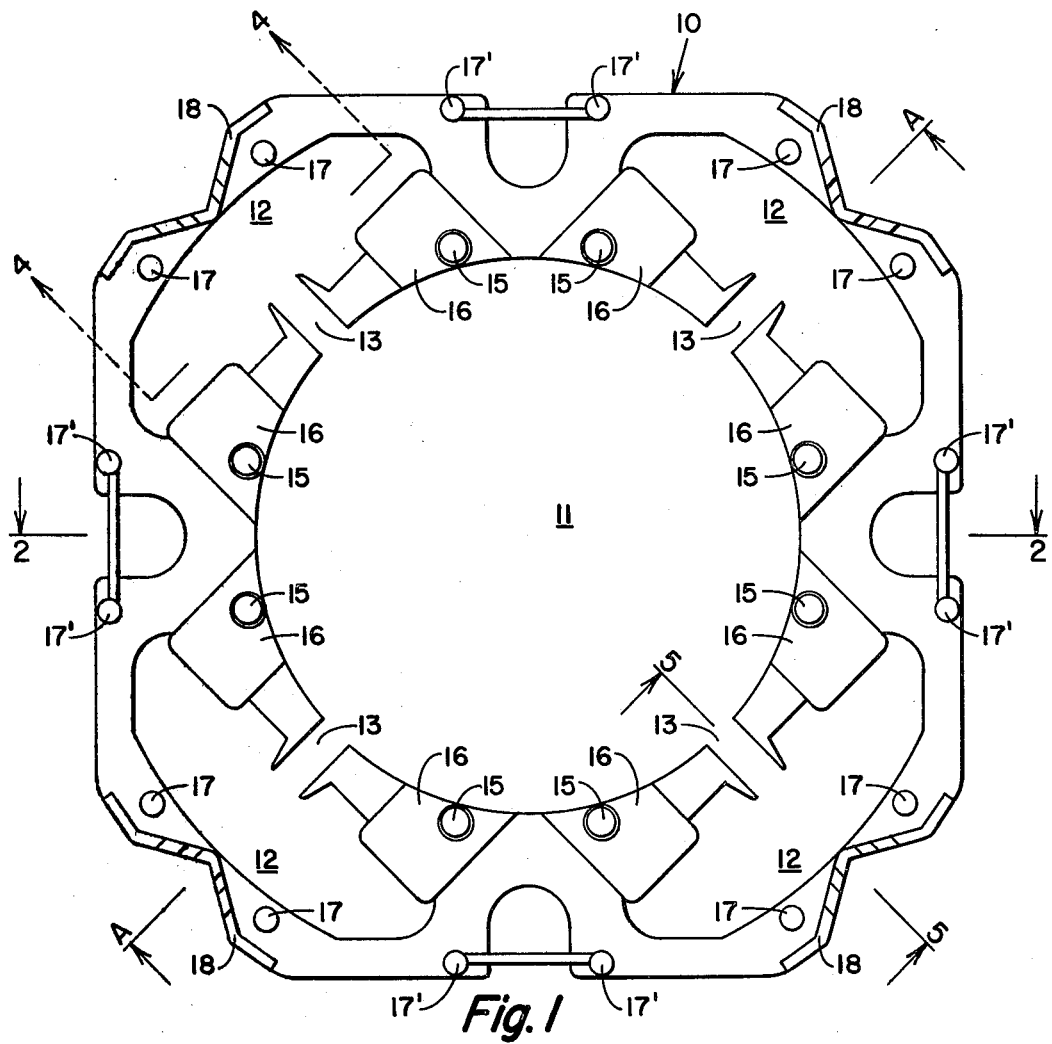
FIG. 1 is a front elevational view of one of the end plates according to the present invention as seen from the outer side.
Figure 2:
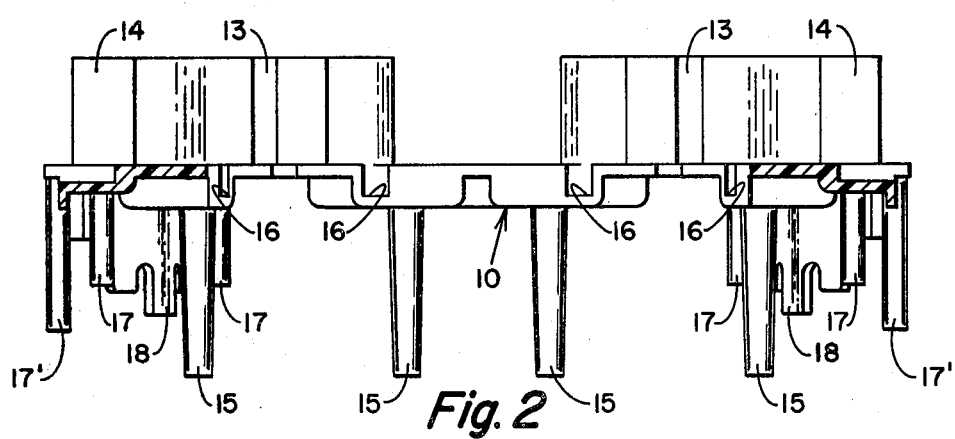
FIG. 2 is a sectional view taken along the line 2—2 in FIG. 1.
Figure 3:
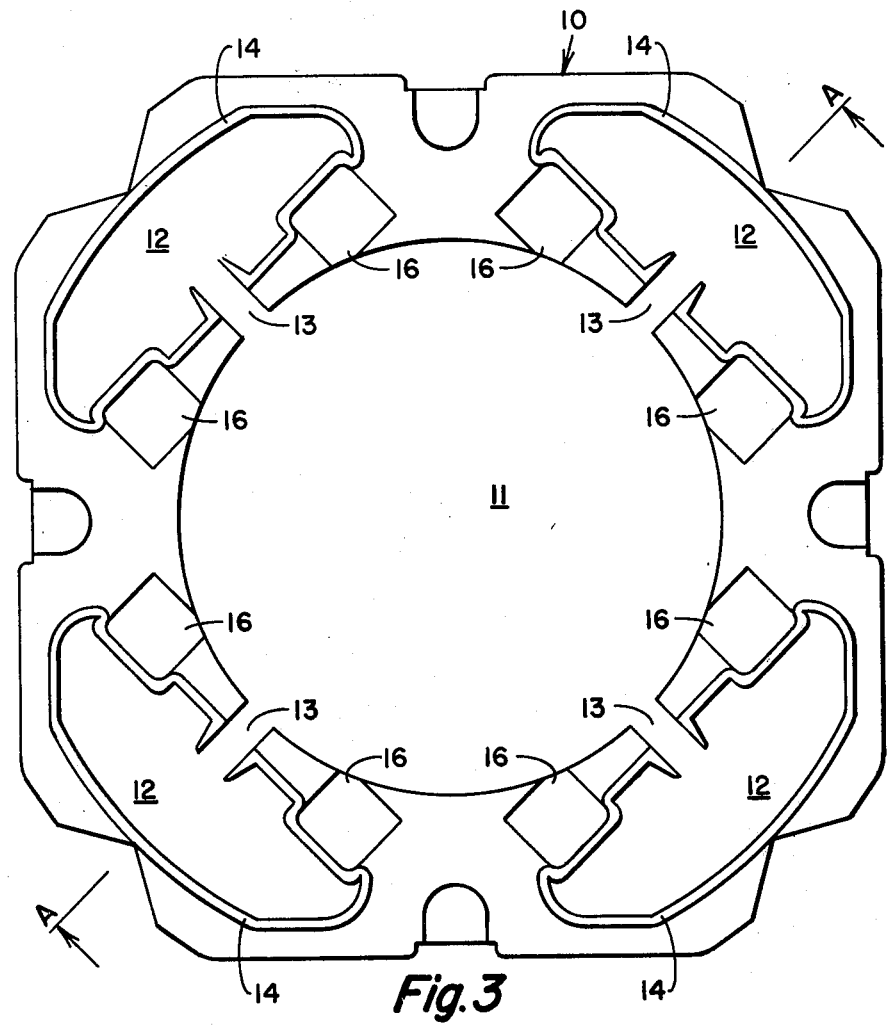
FIG. 3 is a front elevational view of the end plate in FIG. 1, but taken from the opposite side.
Figure 4:
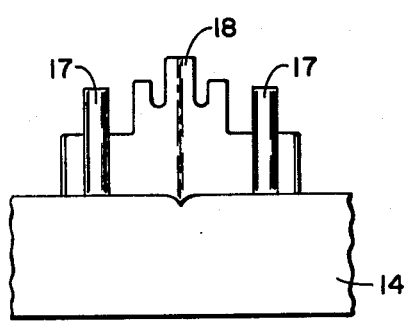
FIG. 4 is a view of the corner detail taken along the line 4—4 in FIG. 1.
Figure 5:
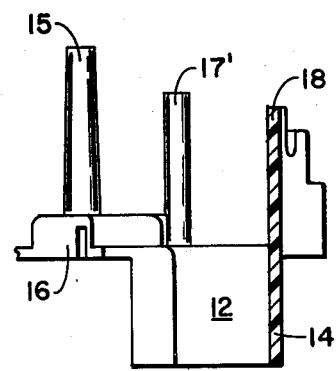
FIG. 5 is a sectional view taken along the line 5—5 in FIG. 1.

Referring now to the drawings and more particularly to FIGS. 1–5, there is shown the end plate according to the invention, generally designated with the reference numeral 10. This plate has a center hole 11 for receiving the rotor of an electrical motor to which this end plate 10 is to be applied. In spaced relationship about the external portion of hole 11 a plurality of cutouts 12 are provided, in this case four in number and located in positions spaced 90° apart. These cutouts 12 have the same contour as the stator slots of the electrical motor and are identical in number. In this case stator also has four slots. However, the number of slots could be greater than four, in which case also the number of cutouts 12 will be greater than four. Since the cutouts 12 have the same shape as the stator slots, which are normally of open type, the cutouts have centrally located radially disposed openings 13 that provide communication between cutouts 12 and the center hole 11. A pair of flanges 13' flank each opening 13 and extend into cutouts 12 for purposes best set forth hereinafter.

On the rear side of the end plate 10 (FIGS. 2 and 3) the cutouts 12 are provided along all the periphery thereof with flanges 14 extending at right angles from the end plate 10. These flanges 14, in this embodiment, extend one half of the axial length of stator slots with which they are to be associated.

On the opposite or front side of the end plate 10 a plurality of posts 15 are located along the periphery of the hole 11, with two posts 15 being associated to each cutout and positioned approximately at the two ends thereof. These posts 15 are intended to support the end turns of the stator windings. At the locations of the posts 15 the end plate is also provided with recesses 16 for receiving the heads of fastening means (not shown) for securing the laminations of the stator. Along the periphery of the end plate 10 additional posts 17 and 17' are provided, which are located in pairs at the four corners and along the four sides, respectively, of the end plate. These additional posts 17 and 17' serve to retain the end turns of the stator windings in between the posts 17 and 17' the posts 15. At the four corners of the end plate 10 there are additional flanges 18 extending from the same side as the posts and opposite that from which the flanges 14 extend, i.e., from the front side, the function of these additional flanges 18 being to also hold and protect the end turns of the stator windings.

All the plate heretofore described is made of an insulating material, preferably plastic material and is integrally obtained by means of a single molding operation.

Figure 6:
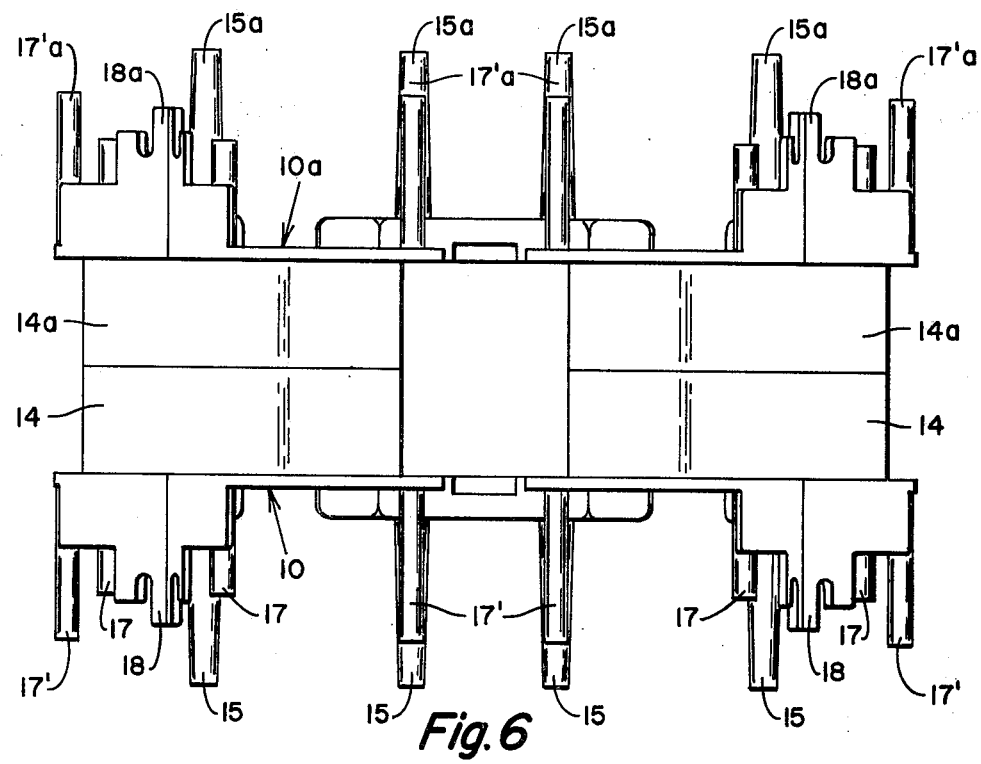
FIG. 6 is a side view of the pair of end plates of FIG. 2 shown in confronting relationship.

The application of the insulating assembly according to the invention to a stator of an electrical motor is extremely simple. Once the stator is formed from a stack of laminations L (FIG. 7) in which slots for receiving the winding have been already punched out, it is sufficient to apply an end plate 10 on the one side of the stator, by inserting the flanges 14 into the stator slots, and another identical end plate 10a on the opposite side of stator again by inserting the flanges 14a into the slots. Since the size of flanges 14, 14a are so selected as to provide a tight fit, the pair of end plates 10, 10a are firmly secured to the stator without requiring additional means and since the flanges 14, 14a extend one half of the axial length of slots, when the two end plates are applied to the stator in confronting relationship, the slots are completely insulated by the flanges 14, 14a (see FIGS. 6 and 7).

Figure 7:
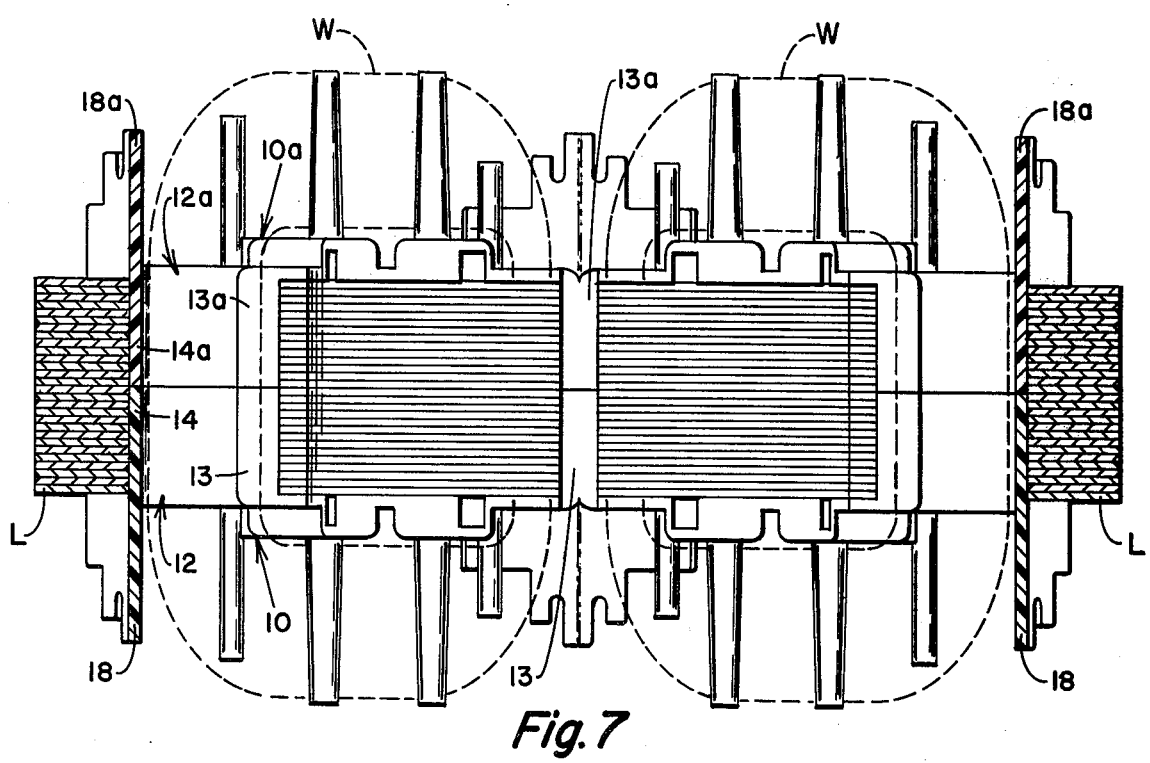
FIG. 7 is an elevational sectional view taken along the line A—A in FIGS. 1 and 3, showing the end plates of FIGS. 1 and 3 assembled together on a stator of an electrical motor.

Once the two end plates 10, 10a are applied to the stator, the formation of the windings W will be initiated by inserting the wires intended to form the windings through the openings 13, 13a of the cutouts 12, 12a (FIG. 7).

During the end turn formation the wires of the windings W will be placed in between posts 15 and posts 17, of the plate 10 and 15a and 17a of the plate 10a so that the end turns will be firmly retained in position.

Figure 8:
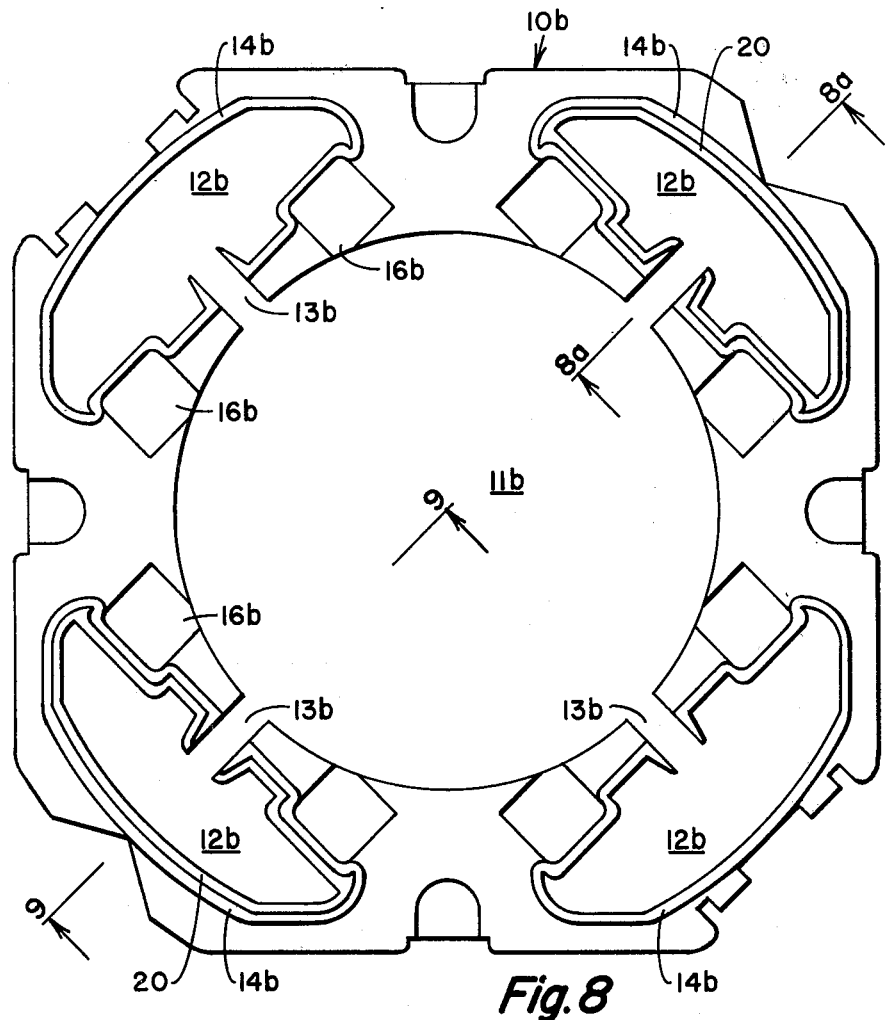
FIG. 8 is a view similar to FIG. 3 of another embodiment of the end plate according to this invention.
Figure 9:
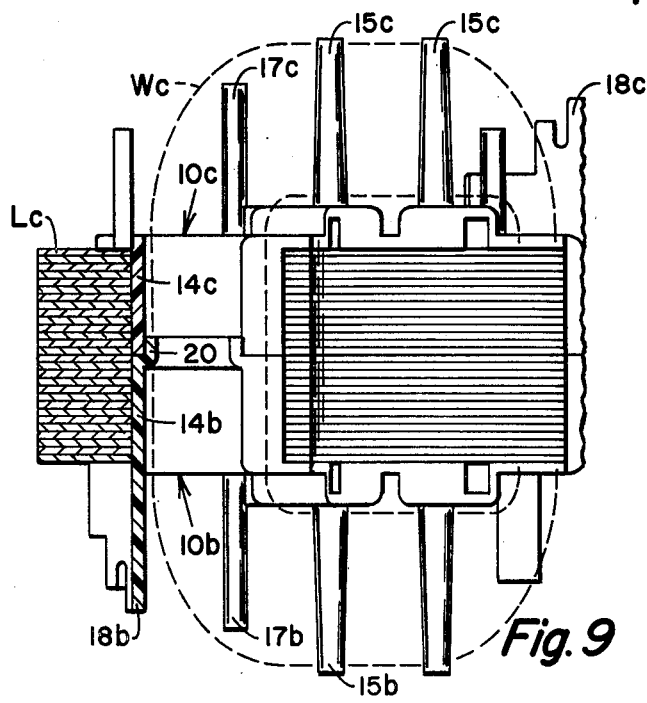
FIG. 9 is an elevational sectional view taken along the line 9—9 in FIG. 8, showing the end plates of FIG. 8 assembled together on a stator of an electrical motor, only the upper half being shown for clarity purposes.
Figure 8A:
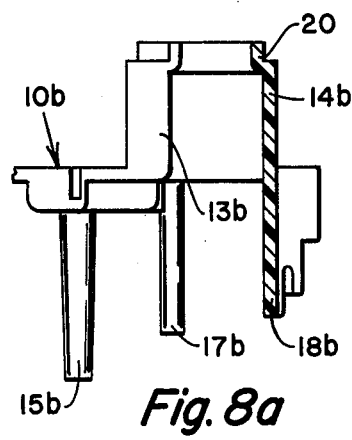
FIG. 8a is a sectional view of a detail of FIG. 8.

Referring now to FIG. 8, 8a and 9, there is shown another embodiment of the invention. The end plate is designated by the reference numeral 10b. This plate 10b has a center hole 11b for receiving the rotor of an electrical motor to which the end plate 10b is to be applied. Around the outer portion of the hole 11b cutouts 12b are provided, in this case four in number located 90° spaced apart. These cutouts 12b have the same contour as the stator slots and are identical in number. Therefore, in the present case, the stator has four slots. However, it should be understood that the slot number could be greater than four, in which case also the number of cutouts 12b will be greater than four. Since the cutouts 12b have the same shape as the stator slots, which are normally of the open-type, the cutouts are provided centrally with openings 13b which communicate the cutouts 12b with the center hole 11b.

On the rear side of the end plate 10b the cutouts 12b have along all the periphery thereof flanges 14b extending at right angles from the end plate 10b. These flanges 14b in this embodiment extend one half of the length of stator slots.

The flanges 14b of one half of cutouts 12b (two in this case) are provided at the free ends thereof extended stepped-down edges 20 each intended to enter one of the flanges 14b without stepped-down edge 20 of the other half of cutouts flanges 14c of an identical confronting end plate 10c, whose parts are designated by same numbers with the suffix "c."

The application of the insulating assembly according to this embodiment to a stator of an electrical motor is extremely simple (see FIG. 9). Once the stator is formed from a stack of laminations Lc in which the slots for receiving the windings Wc are punched out, it will be sufficient to apply an end plate 10b on one side of the stator by inserting the flanges 14b into the stator slots and another identical end plate 10c on the opposite side of stator, however turned by 90°, in this case with four slot stator (or by an angle of 360/n degrees, where n is an even slot number) with respect to the first end plate 10b. In this manner the stepped-down edge 20 of the flanges 14b of the end plate 10b will enter a flange 14c without stepped-down edge 20 of the end plate 10c and such "box like" interlocking will accommodate the tolerances which might cause a lack-of-contact between the ends of two opposing flanges in the same slot, as shown in the first embodiment and thereby the insulation will not be damaged.

It will be apparent from the foregoing that by means of the insulating assembly according to the invention the stator slots of an electrical motor will be accurately insulated from the stator windings and also the stator faces will be accurately insulated in a manner as simple as possible without the danger of breakage or damage of the insulation of slots during the winding forming operation.

Of course, the invention is not limited to the described embodiments, but various changes and modifications can be made thereto without departing from the scope of the invention. More particularly, the flanges of an end plate could be longer than the flanges of the other end plate.

What I claim is:

1. An insulating assembly for use with a slotted stator in an electrical motor, including a pair of identical end plates of insulating material each having a center opening for receiving a rotor of said motor and a plurality of cutouts symmetrically spaced around said opening and having a complimentary shape to the said stator slots of said electrical motor, each of said cutouts having along the periphery thereof a flange extending from said end plate, one half the total number of said flanges of each end plate of said pair being provided at the free ends thereof with an extended stepped-down edge complimentary to and acceptable within the corresponding other half of the flanges of the other plate of said pair, one of said pair of end plates adapted to be positioned on each end of said stator with corresponding mating flanges inserted in one of said stator slots so as to form an insulating interlocked partition between the inner wall of said slots and a stator winding extending between adjacent slots, as well as substantially insulating the opposite end surfaces of said stator.

2. An assembly as claimed in claim 1, characterized in that each end plate is provided with posts which extend from the side opposite that from which said flanges extend, said posts being integrally formed with the plate and adapted to retain and confine the end turns of said stator windings.

3. An assembly as claimed in claim 1, characterized in that said flanges extend at right angles from the end plate.

4. An assembly as claimed in claim 1, characterized in that said flanges are substantially continuous in the shape of an elongated ring that is split at the point where the wires forming the winding are to be inserted.

5. An assembly as claimed in claim 2, characterized in that each plate is generally polygonal and provided at the corners thereof with additional flanges extending generally perpendicular to said plate in the same direction as said posts for holding and protecting the stator windings.

6. An assembly as claimed in claim 1, characterized in that each of said flanges have an axial extent equal to substantially one half of the axial length of slots so that when said end plates are applied on the opposite ends of the stator said flanges substantially cover the full length of said stator slots.

* * * * *